(12) United States Patent
Watanabe et al.

(10) Patent No.: US 10,294,929 B2
(45) Date of Patent: May 21, 2019

(54) LIQUID SUPPLY DEVICE

(71) Applicant: KAWASAKI JUKOGYO KABUSHIKI KAISHA, Kobe-shi, Hyogo (JP)

(72) Inventors: Kei Watanabe, Kobe (JP); Hideki Satou, Kobe (JP); Daisuke Ihara, Nishinomiya (JP); Akira Shoji, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 163 days.

(21) Appl. No.: 15/112,214

(22) PCT Filed: Jan. 16, 2014

(86) PCT No.: PCT/JP2014/000199
§ 371 (c)(1),
(2) Date: Jul. 18, 2016

(87) PCT Pub. No.: WO2015/107567
PCT Pub. Date: Jul. 23, 2015

(65) Prior Publication Data
US 2016/0333870 A1    Nov. 17, 2016

(51) Int. Cl.
*F04B 19/02* (2006.01)
*F04B 9/02* (2006.01)
(Continued)

(52) U.S. Cl.
CPC ............ *F04B 19/022* (2013.01); *F04B 9/025* (2013.01); *F04B 9/047* (2013.01); *F04B 17/03* (2013.01);
(Continued)

(58) Field of Classification Search
CPC ................................ F04B 29/00; F04B 19/022
(Continued)

(56) References Cited

U.S. PATENT DOCUMENTS 577,342 A * 2/1897 Bain .................. F15B 7/10
60/572
841,649 A * 1/1907 Howe et al. .............. E02D 7/10
91/216 B
(Continued)

FOREIGN PATENT DOCUMENTS

CN   101806295 A      8/2010
GB      302695 A *   1/1930 ................ F04B 5/02
(Continued)

OTHER PUBLICATIONS

Jul. 23, 2013 Office Action issued in Japanese Patent Application No. 2012-287783.
(Continued)

*Primary Examiner* — Michael Leslie
*Assistant Examiner* — Matthew Wiblin
(74) *Attorney, Agent, or Firm* — Oliff PLC (57) ABSTRACT

A liquid supply device which supplies liquid to a target object, comprises a cylinder having both ends closed; a piston which comparts an inner space of the cylinder into a first space and a second space, and is relatively slidable on an inner wall surface of the cylinder; a piston rod which extends to penetrate an end portion of the cylinder and has a tip end portion connected to the piston; a frame member to which a portion of the piston rod which is located outside the cylinder is fastened; a drive section which causes the cylinder to reciprocate in a direction in which the piston rod extends; a first flow line which is in communication with the first space to flow the liquid therethrough; and a second flow line which is in communication with the second space to flow the liquid therethrough.

5 Claims, 10 Drawing Sheets

(51) Int. Cl.
    *F04B 17/03*     (2006.01)
    *F04B 49/22*     (2006.01)
    *F16H 25/22*     (2006.01)
    *F04B 9/04*     (2006.01)
    *F04B 53/14*     (2006.01)
    *F16H 25/20*     (2006.01)

(52) U.S. Cl.
    CPC .............. *F04B 49/22* (2013.01); *F04B 53/14* (2013.01); *F04B 53/148* (2013.01); *F16H 25/2204* (2013.01); *F16H 2025/204* (2013.01)

(58) Field of Classification Search
    USPC .................... 92/117 A, 117 R; 222/249, 250
    See application file for complete search history.

(56) References Cited

U.S. PATENT DOCUMENTS

| | | | | |
|---|---|---|---|---|
| 1,315,527 | A * | 9/1919 | Sara | F04B 33/005 |
| | | | | 92/117 R |
| 1,389,039 | A * | 8/1921 | Estes | F01B 3/06 |
| | | | | 417/467 |
| 1,557,936 | A * | 10/1925 | Jouanneaux | F04B 29/00 |
| | | | | 417/464 |
| 2,287,360 | A * | 6/1942 | Sappington | F04B 29/00 |
| | | | | 417/460 |
| 2,804,051 | A * | 8/1957 | Lushansky, Jr. | B23D 67/00 |
| | | | | 91/216 B |
| 4,403,639 | A * | 9/1983 | Holte | B60C 27/08 |
| | | | | 148/211 |
| 4,726,283 | A * | 2/1988 | Miyamoto | F15B 11/0365 |
| | | | | 29/888.044 |
| 4,872,359 | A * | 10/1989 | Schulz | B60B 39/006 |
| | | | | 188/4 B |
| 2004/0208750 | A1* | 10/2004 | Masuda | F04B 9/02 |
| | | | | 417/42 |
| 2005/0254972 | A1* | 11/2005 | Baker | F04B 9/02 |
| | | | | 417/415 |

FOREIGN PATENT DOCUMENTS

| | | |
|---|---|---|
| JP | H04-79978 U | 7/1992 |
| JP | H07-119712 A | 5/1995 |
| JP | 2001-090702 A | 4/2001 |
| JP | 2006-063804 A | 3/2006 |

OTHER PUBLICATIONS

Apr. 8, 2014 International Search Report issued in International Patent Application No. PCT/JP2014/000199.

Jul. 19, 2016 IPRP issued in International Patent Application No. PCT/JP2014/000199.

Jan. 5, 2017 Office Action issued in Chinese Patent Application No. 201480072064.0.

\* cited by examiner

LIQUID SUPPLY DEVICE

TECHNICAL FIELD

The present invention relates to a liquid supply device. Particularly, the present invention relates to a liquid supply device for supplying a coating material or the like.

BACKGROUND ART

Conventionally, there is known a liquid supply device which supplies liquid such as a coating material in a specified amount.

This liquid supply device includes a cylinder body having two openings, a sliding block which is slidable on the inner wall surface of the cylinder body, an electric actuator, and a fluid pressure cylinder. The electric actuator includes a driving rod coupled to the sliding block in such a manner that the driving rod is extendable and retractable along the axis of the cylinder body. The electric actuator is placed on the axis of the cylinder body at a location that is outward relative to one end portion of the cylinder body. The electric actuator operates to drive the sliding block. The fluid pressure cylinder includes a piston rod coupled to the sliding block in such a manner that the driving rod is extendable and retractable along the axis of the cylinder body. The fluid pressure cylinder is placed on the axis of the cylinder body at a location that is outward relative to one end portion of the cylinder body. The fluid pressure cylinder operates to drive the sliding block.

To supply liquid in a specified amount, the electric actuator and the fluid pressure cylinder operate to move the sliding block along the axis of the cylinder body. This allows the liquid to flow into one of two inner space formed by comparting the inner space of the cylinder by the sliding block, through one of the openings, and discharge the liquid from the other inner space through the other opening.

CITATION LIST

Patent Literature

Patent Literature 1: Japanese Laid-Open Patent Application Publication No. 2006-63804

SUMMARY OF INVENTION

Technical Problem

However, in the liquid supply device disclosed in Patent Literature 1, since the electric actuator and the fluid pressure cylinder are placed on the axis of the cylinder body, the axis of the driving rod, and the axis of the piston rod, the axial size of the liquid supply device is increased, and the liquid supply device cannot be installed in the vicinity of the discharge gun. This causes an increase in a pipe connecting the liquid supply device to a discharge gun. As a result, a responsivity of the liquid supply device degrades.

Conventionally, a gear pump is used as the liquid supply device of a small size. The gear pump causes a pulsation in its discharge speed. For this reason, the use of the liquid supply device is limited.

Solution to Problem

To achieve the above-described object, according to an aspect of the present invention, a liquid supply device which supplies liquid to a target object, comprises: a cylinder having both ends closed; a piston which comparts an inner space of the cylinder into a first space and a second space, and is relatively slidable on an inner wall surface of the cylinder; a piston rod which extends to penetrate an end portion of the cylinder and has a tip end portion connected to the piston; a frame member to which a portion of the piston rod which is located outside the cylinder is fastened; a drive section which causes the cylinder to reciprocate in a direction in which the piston rod extends; a first flow line which is in communication with the first space to flow the liquid therethrough; and a second flow line which is in communication with the second space to flow the liquid therethrough.

In accordance with this configuration, the drive section drives the cylinder to allow the cylinder and the piston to be relatively movable, and thus the liquid can be discharged. This makes it possible to prevent a pulsation from occurring in the discharge speed of the liquid. Thus, the liquid supply device is applicable to a variety of uses.

In addition, the drive section need not be placed in the axial direction of the piston rod, and the length of the liquid supply device in the axial direction of the piston rod can be reduced. In this configuration, the size of the liquid supply device can be reduced. For example, the lengths of pipes connecting the liquid supply device to the discharge gun can be reduced, by mounting the liquid supply device in a robot. As a result, a responsivity of the liquid supply device can be improved.

The drive section may be placed laterally relative to the cylinder.

In accordance with this configuration, the length of the liquid supply device in the axial direction of the piston rod can be reduced.

The drive section may include a motor, and a driving force transmission mechanism which converts a rotational force of the motor into a linear movement force, and causes a movable member to linearly move in a direction parallel to an axial direction of the piston rod, the portion of the piston rod which is located outside the cylinder may be configured to be capable of being unfastened, and the cylinder may be detachably mounted to the movable member.

In accordance with this configuration, replacement (change) of the cylinder, the piston, and the piston rod can be performed easily and quickly.

The driving force transmission mechanism may include a ball screw extending in parallel with the axial direction of the piston rod, a slider which is threadingly engageable with the ball screw, and a guide bar which extends in parallel with the ball screw, and guides the slider in a direction in which the guide bar extends.

In accordance with this configuration, the cylinder can be positioned in the axial direction of the cylinder, with a high accuracy.

The first flow line or the second flow line may be in communication with the first space or the second space, respectively, via a passage formed inside the piston rod and a passage formed inside the piston.

In accordance with this configuration, it becomes possible to eliminate a need for a movable member which follows the reciprocating movement of the cylinder, in at least one of the first flow line and the second flow line.

Advantageous Effects of Invention

In accordance with the present invention, it becomes possible to prevent a pulsation from occurring in the discharge speed of liquid. Thus, the liquid supply device is applicable to a variety of uses. In addition, the length of the liquid supply device in the axial direction of the piston rod can be reduced.

DESCRIPTION OF EMBODIMENTS

Hereinafter, the embodiment of the present invention will be described with reference to the drawings. Throughout the drawings, the same or corresponding components are designated by the same reference symbols and will not be described repeatedly.

[Overall Configuration]

Figure 1:
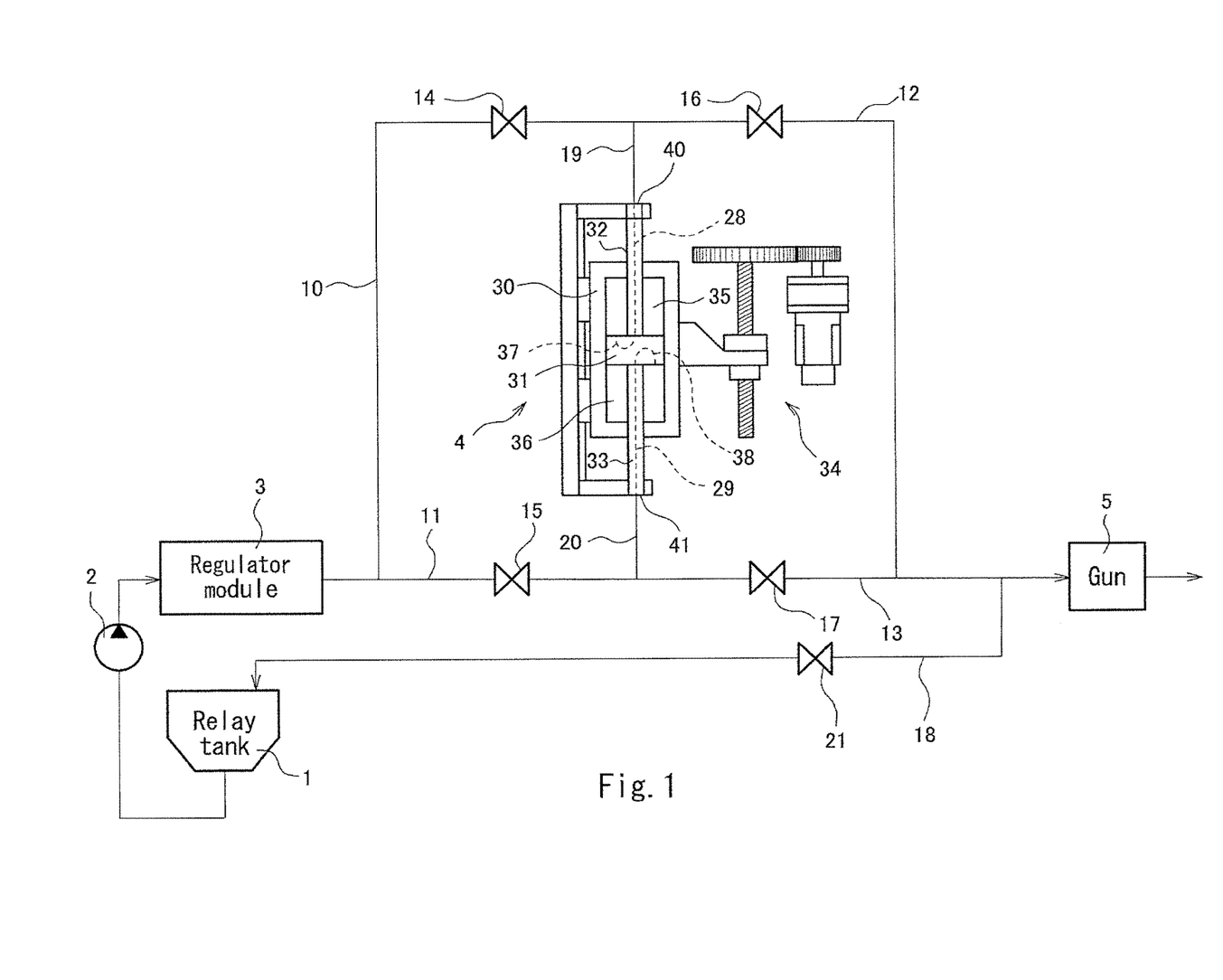
FIG. 1 is a view schematically showing the exemplary configuration of a liquid supply device according to the embodiment of the present invention.

FIG. 1 is a view schematically showing the exemplary configuration of a liquid supply device 100 according to the embodiment of the present invention.

The liquid supply device 100 is a device which supplies liquid in a specified amount to a discharge gun 5 attached to the tip end of an arm of a robot (not shown). An example of the robot is a multi joint type robot, etc. Examples of the liquid are coating materials such as a vinyl chloride resin coated on the back surface of a floor of a body, a sealer material coated on, for example, the interior of a body of an automobile, or a damping material. However, the liquid is not limited to these.

The discharge gun 5 has an opening at a tip end portion thereof. This opening is opened and closed by a control section of the robot.

As shown in FIG. 1, the liquid supply device 100 includes a relay tank 1, a material supply pump 2, a regulator module 3, a liquid supply device body 4, and a control unit 59 (see FIG. 5) which controls the operation of the liquid supply device 100. The relay tank 1, the material supply pump 2, the regulator module 3, and the liquid supply device body 4 are connected to each other via flow lines which are pipes through which the liquid is flowed as will be described later. For easier understanding of the description, a downstream side in a direction in which the liquid is flowed through the flow lines will be referred to as downstream, while an upstream side in the direction in which the liquid is flowed through the flow lines will be referred to as upstream.

The relay tank 1 is a tank which stores the liquid therein.

The material supply pump 2 is a pump which supplies the liquid stored in the relay tank 1 to the liquid supply device body 4.

The regulator module 3 is a module which regulates a pressure of the liquid to be supplied to the liquid supply device body 4 by the material supply pump 2.

The liquid supply device body 4 is a device which supplies the liquid supplied by the material supply pump 2 in a specified amount to the discharge gun.

The flow lines include a first supply line 10, a second supply line 11, a first discharge line 12, a second discharge line 13, and a material return line 18.

The first supply line 10 connects the material supply pump 2 to a first supply/discharge port 40 (the detail will be described later), and supplies the liquid supplied by the material supply pump 2 to the first supply/discharge port 40. A first shutoff valve 14 is provided in a path of the first supply line 10. The first shutoff valve 14 is controlled by the control unit 59, and is configured to open and close the first supply line 10.

The second supply line 11 connects the material supply pump 2 to a second supply/discharge port 41 (the detail will be described later), and supplies the liquid supplied by the material supply pump 2 to the second supply/discharge port 41. A second shutoff valve 15 is provided in a path of the second supply line 11. The second shutoff valve 15 is controlled by the control unit 59, and is configured to open and close the second supply line 11.

The first discharge line 12 connects the first supply/discharge port 40 to the discharge gun 5, and supplies the liquid discharged from the first supply/discharge port 40 to the discharge gun 5. A third shutoff valve 16 is provided in a path of the first discharge line 12. The third shutoff valve 16 is controlled by the control unit 59, and is configured to open and close the first discharge line 12.

The second discharge line 13 connects the second supply/discharge port 41 to the discharge gun 5, and supplies the liquid discharged from the second supply/discharge port 41 to the discharge gun 5. A fourth shutoff valve 17 is provided in a path of the second discharge line 13. The fourth shutoff valve 17 is controlled by the control unit and configured to open and close the second discharge line 13.

The material return line 18 is configured to branch from the first discharge line 12 at a location that is downstream of the third shutoff valve 16 and from the second discharge line 13 at a location that is downstream of the fourth shutoff valve 17. The material return line 18 connects the first discharge line 12 and the second discharge line 13 to the relay tank 1. The material return line 18 is able to return the liquid flowing through the first discharge line 12 and the second discharge line 13 to the relay tank 1. A back flow shutoff valve 21 is provided in a path of the material return line 18. The back flow shutoff valve 21 is controlled by the control unit 59 and is configured to open and close the material return line 18.

In the present embodiment, the first supply line 10 and the first discharge line 12 merge into a first merge section 19, at the downstream end portion of the first supply line 10 and the upstream end portion of the first discharge line 12. However, the configuration of the first supply line 10 and the first discharge line 12 is not limited to this. Alternatively, each of the first supply line 10 and the first discharge line 12 may be connected to the first supply/discharge port 40. In addition, the second supply line 11 and the second discharge line 13 merge into a second merge section 20, at the downstream end portion of the second supply line 11 and the upstream end portion of the second discharge line 13. However, the configuration of the second supply line 11 and the second discharge line 13 is not limited to this. Alternatively, each of the second supply line 11 and the second discharge line 13 may be connected to the second supply/discharge port 41.

[Configuration of Liquid Supply Device Body]

Figure 2:
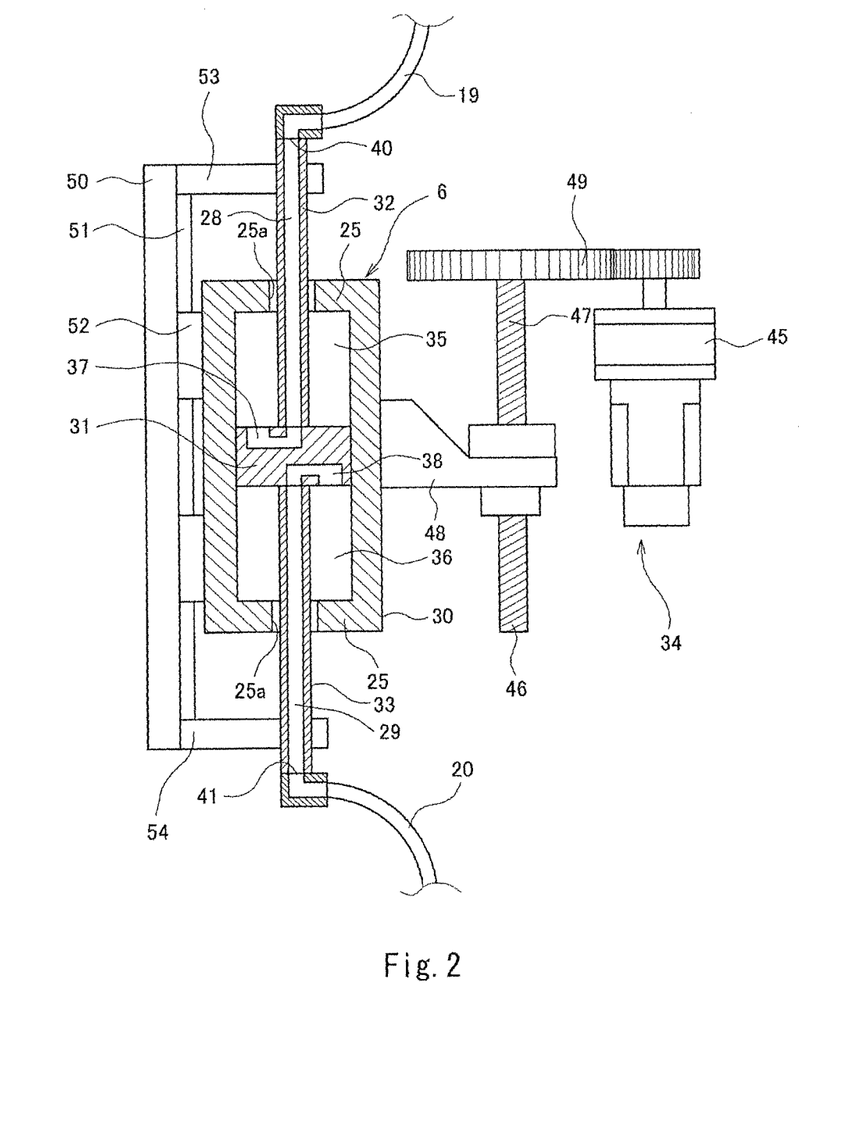
FIG. 2 is a view showing the exemplary configuration of a liquid supply device body of the liquid supply device of FIG. 1.

FIG. 2 is a view showing the exemplary configuration of the liquid supply device body 4 of the liquid supply device of FIG. 1.

As shown in FIG. 2, the liquid supply device body 4 includes a cylinder 30, a piston 31, a first piston rod 32, a second piston rod 33, a cylinder drive section 34, and a frame member (not shown) for allowing the cylinder 30, the piston 31, the first piston rod 32, the second piston rod 33, and the cylinder drive section 34 to be placed in a predetermined positional relationship.

The cylinder 30 has a hollow cylinder shape. The cylinder 30 has end portion wall surfaces 25 at both ends thereof, which close the end portions of the cylinder 30. Each of the end portion wall surfaces 25 is formed with a through-hole 25a penetrating the end portion wall surface 25, at the center of the end portion wall surface 25, namely on the center axis of the cylinder 30.

The piston 31 is formed by a cylindrical block. The piston 31 is placed in the inner space of the cylinder 30 in such a manner that the axis of the piston 31 is located on the axis of the cylinder 30. The piston 31 is relatively slidable on the inner wall surface of the cylinder 30. The piston 31 axially comparts the inner space of the cylinder 30 into a first space 35 and a second space 36 in the axial direction of the cylinder 30.

In the present embodiment, the piston 31 includes a first piston inner passage 37 and a second piston inner passage 38 which are conduits formed inside the piston 31. The both ends of the first piston inner passage 37 are opened in a surface of the piston 31 which faces the first space 35. The both ends of the second piston inner passage 38 are opened in a surface of the piston 31 which faces the second space 36.

The first piston rod 32 has a hollow cylinder shape. The inner space of the first piston rod 32 constitutes a first piston rod inner passage 28. The first piston rod 32 is inserted into the through-hole 25a of the end portion wall surface 25 of the cylinder 30 which facts the first space 35, and is placed on the axis of the cylinder 30. However, the configuration of the first piston rod 32 is not limited to this. Alternatively, the first piston rod 32 may be placed to extend in parallel with the axis of the cylinder 30.

The tip end portion of the first piston rod 32 may be connected to one of the openings of the first piston inner passage 37. Therefore, the first piston inner passage 37 constitutes a passage via which the first space 35 and the first piston rod inner passage 28 are in communication with each other. An opening at the base end of the first piston rod 32 constitutes the first supply/discharge port 40. As described above, the first supply/discharge port 40 is connected to the first merge section 19. The first piston inner passage 37, the first piston rod inner passage 28, the first supply line 10, and the first discharge line 12 constitute a first flow line which is in communication with the first merge section 19.

The second piston rod 33 has a hollow cylinder shape. The inner space of the second piston rod 33 constitutes a second piston rod inner passage 29. The second piston rod 33 is inserted into the through-hole 25a of the end portion wall surface 25 of the cylinder 30 which faces the second space 36, and is placed on the axis of the cylinder 30. However, the configuration of the second piston rod 33 is not limited to this. Alternatively, the second piston rod 33 may be placed to extend in parallel with the axis of the cylinder 30.

The tip end portion of the second piston rod 33 may be connected to one of the openings of the second piston inner passage 38. Therefore, the second piston inner passage 38 constitutes a passage via which the second space 36 and the second piston rod inner passage 29 are in communication with each other. An opening at the base end of the second piston rod 33 constitutes the second supply/discharge port 41. As described above, the second supply/discharge port 41 is connected to the second merge section 20. The second piston inner passage 38, the second piston rod inner passage 29, the second supply line 11, and the second discharge line 13 constitute a second flow line which is in communication with the second merge section 20.

Annular sealing members (e.g., O-rings) are placed between the side surface of the first piston rod 32 and the inner wall surface of the corresponding through-hole 25a of the cylinder 30, and between the side surface of the second piston rod 33 and the inner wall surface of the corresponding through-hole 25a of the cylinder 30. The side surface of the first piston rod 32 and the inner wall surface of the corresponding through-hole 25a are relatively slidable in a liquid-tight state. The side surface of the second piston rod 33 and the inner wall surface of the corresponding through-hole 25a are relatively slidable in a liquid-tight state.

The cylinder drive section 34 includes a servo motor 45 and a ball screw mechanism 46.

The servo motor 45 is placed laterally relative to the cylinder 30.

The ball screw mechanism 46 includes a ball screw 47 and a slider (movable member) 48.

The ball screw 47 is placed in such a manner that its axis extends in parallel with the axis of the cylinder 30. The ball screw 47 is placed laterally relative to the cylinder 30. The ball screw 47 is connected to the servo motor 45 via a reduction gear 49.

Figure 3:
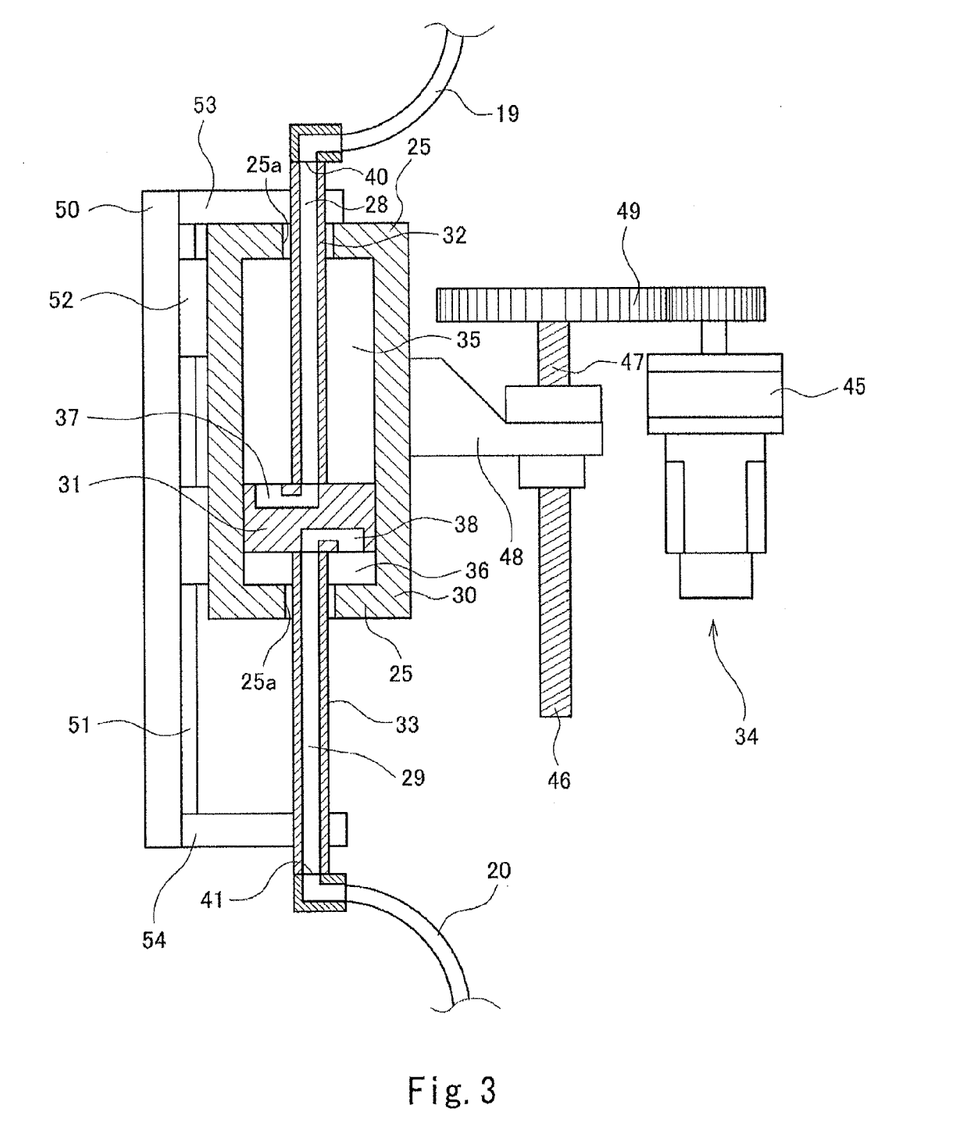
FIG. 3 is a view showing the exemplary configuration of the liquid supply device body of the liquid supply device of FIG. 1.
Figure 4:
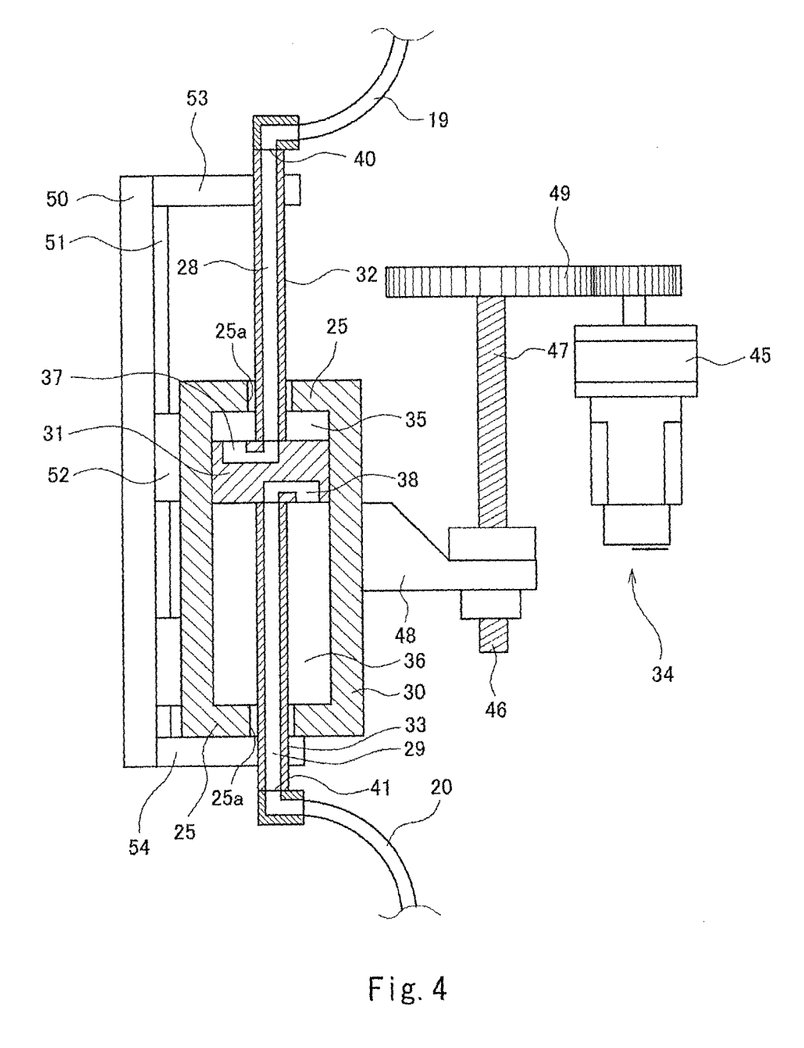
FIG. 4 is a view showing the exemplary configuration of the liquid supply device body of the liquid supply device of FIG. 1.

FIG. 3 is a view showing the exemplary configuration of the liquid supply device body 4. FIG. 3 shows a state in which the cylinder 30 is located at a first position. FIG. 4 is a view showing the exemplary configuration of the liquid supply device body 4. FIG. 4 shows a state in which the cylinder 30 is located at a second position.

The slider 48 is coupled to the cylinder 30 in such a manner that the slider 48 is engageable with and disengageable from the cylinder 30. The cylinder 30 is movable in a direction in which the ball screw 47 extends, according to the rotation of the ball screw 47. The ball screw mechanism 46 causes the cylinder 30 to be movable between the first position shown in FIG. 3 and the second position shown in FIG. 4. This makes it possible to position the cylinder 30 with a high accuracy in the axial direction of the cylinder 30.

In the present embodiment, the liquid supply device body 4 includes a guide rail mechanism 50.

The guide rail mechanism 50 includes a guide rail 51 extending in the axial direction of the first and second piston rods 32, 33, and a guide rail slider 52 which is movable on the guide rail 51. In this configuration, the cylinder 30 is guided by the guide rail slider 52 in such a manner that the cylinder 30 reciprocates between the first position and the second position. The guide rail slider 52 and the cylinder 30 are detachably (removably) mounted to each other. At the both end portions of the guide rail 51, a first piston rod support section 53 and a second piston rod support section 54 extend in a direction that is substantially perpendicular to the direction in which the guide rail 51 extends. The first piston rod support section 53 and the second piston rod support section 54 extend in parallel with each other. The first piston rod support section 53 is configured to be capable of fasten a portion of the first piston rod 32 which is located outside the cylinder 30, while the second piston rod support section 54 is configured to be capable of fasten a portion of the second piston rod 33 which is located outside the cylinder 30.

In the present embodiment, the first piston rod 32 and the second piston rod 33 are detachably (removably) mounted to the guide rail mechanism 50. The first piston rod 32 and the second piston rod 33 are configured to be capable of unfastened with respect to the guide rail mechanism 50.

Although in the present embodiment, the first piston rod 32 and the second piston rod 33 are fastened to the guide rail mechanism 50 as described above, the configuration of the first piston rod 32 and the second piston rod 33 is not limited to this. Alternatively, the first piston rod 32 and the second piston rod 33 may be fastened to the frame member of the liquid supply device body 4.

The cylinder 30, the piston 31, the first piston rod 32, and the second piston rod 33 constitute a body unit 6. As described above, this body unit 6 is detachably (removably) mounted to the guide rail mechanism 50, the cylinder drive section 34, the first merge section 19, and the second merge section 20. In this configuration, for example, in a case where the piston rod is abraded, the body unit 6 can be replaced (changed) in such a manner that the body unit 6 including the abraded piston rod is detached from the liquid supply device body 4, and a new body unit 6 is mounted to the liquid supply device body 4. Thus, the change of the body unit 6 can be performed easily and quickly.

The first flow line is in communication with the first space 35 via the first piston inner passage 37 and the first piston rod inner passage 28, while the second flow line is in communication with the second space 36 via the second piston inner passage 38 and the second piston rod inner passage 29. This can eliminate a need for a movable member which follows the reciprocating movement of the cylinder 30 in the first and second flow lines. In a case where the body unit 6 is replaced with new one, the first merge section 19 may be detached from the first piston rod 32 of the body unit 6 to be detached, the first piston rod 32 of the new body unit 6 and the first merge section 19 may be connected to each other, the second merge section 20 may be detached from the second piston rod 33 of the body unit 6 to be detached, and the second piston rod 33 of the new body unit 6 and the second merge section 20 may be connected to each other. Thus, the replacement (change) of the body unit 6 can be performed more easily and more quickly.

[Control Section]

Figure 5:
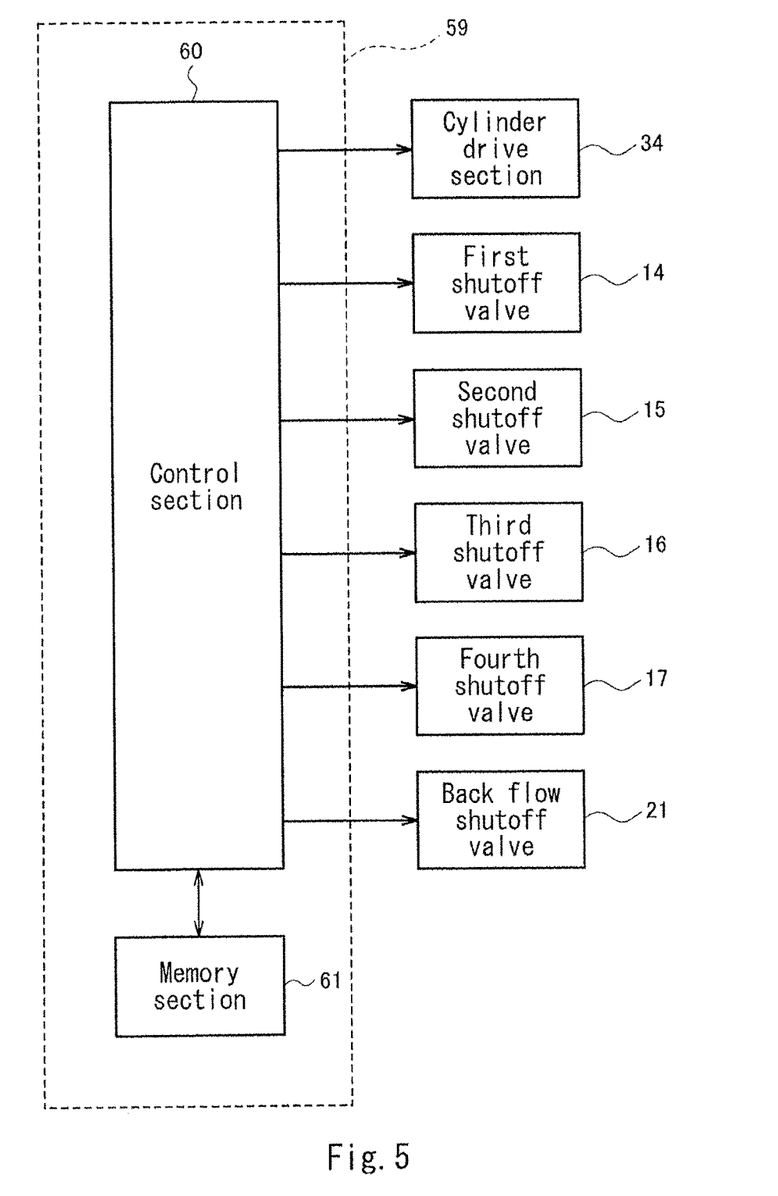
FIG. 5 is a block diagram schematically showing the exemplary configuration of a control system of the liquid supply device of FIG. 1.

The control unit 59 of the liquid supply device 100 includes, for example, a control section 60 including a processor such as a CPU, and a memory section 61 including memories such as ROM and RAM. The control section 60 may be configured as a single control unit which performs a control in a centralized manner or as a plurality of control units which perform a control cooperatively in a distributed manner. The control section 60 is configured to control the operations of the cylinder drive section 34, the first shutoff valve 14, the second shutoff valve 15, the third shutoff valve 16, the fourth shutoff valve 17, and the back flow shutoff valve 21, to thereby control the operation of the liquid supply device 100. Specified control programs are stored in the memory section 61. The control section reads out the control programs from the memory section 61, executes the control programs, and thus controls the operation of the liquid supply device 100.

[Exemplary Operation]

Next, the exemplary operation of the liquid supply device 100 will be described.

First of all, the operation for locating the cylinder 30 at an initial position will be described.

Figure 6:
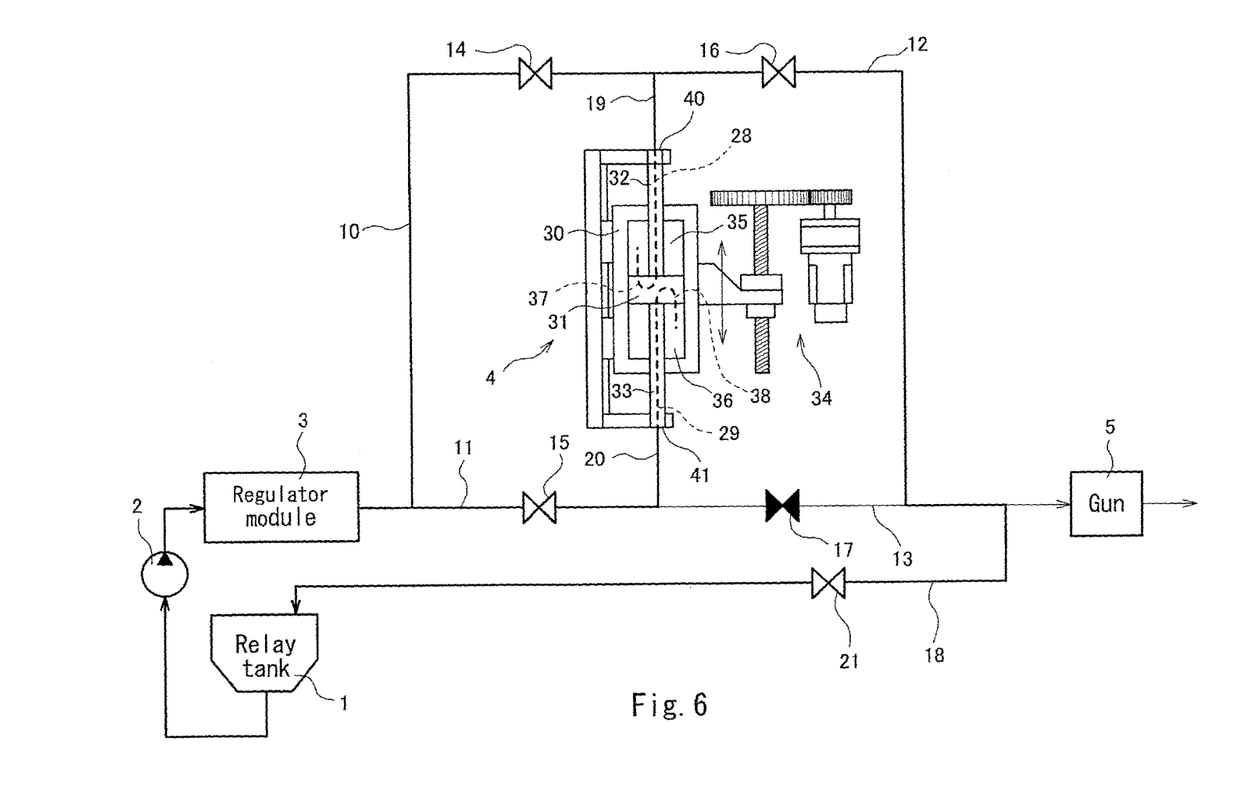
FIG. 6 is a view showing the exemplary operation of the liquid supply device of FIG. 1.
Figure 7:
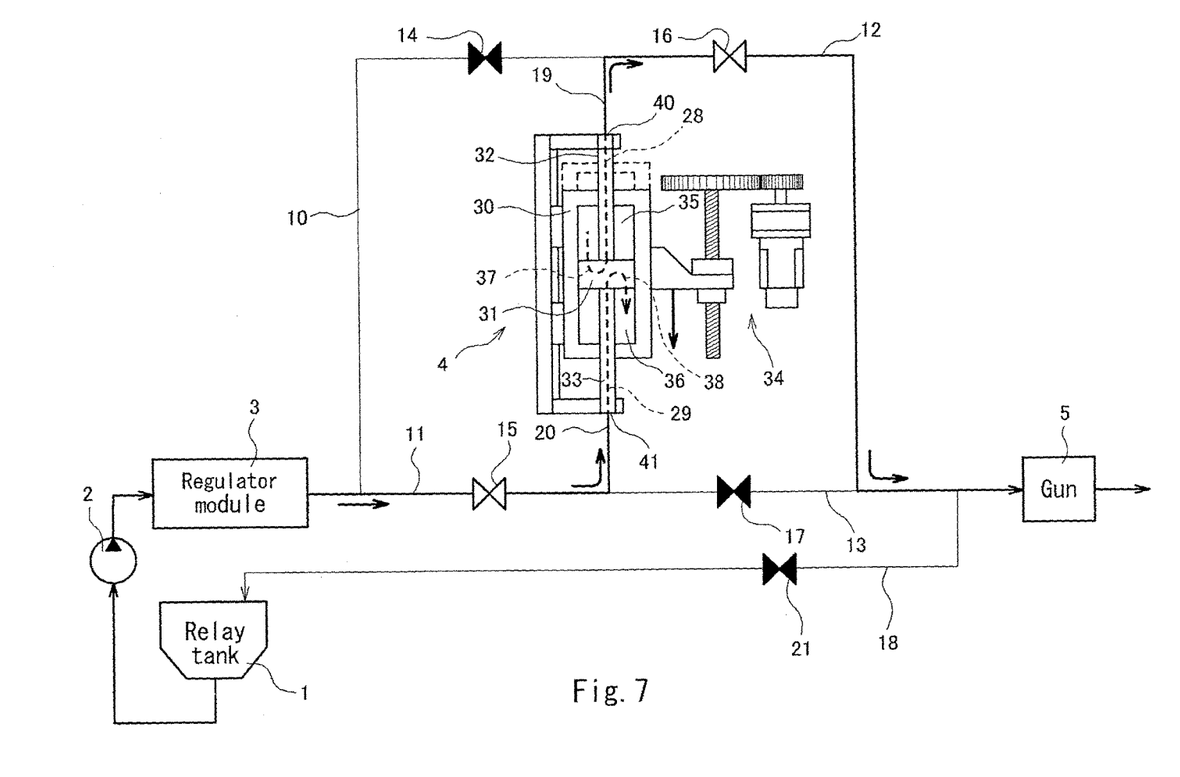
FIG. 7 is a view showing the exemplary operation of the liquid supply device of FIG. 1.
Figure 8:
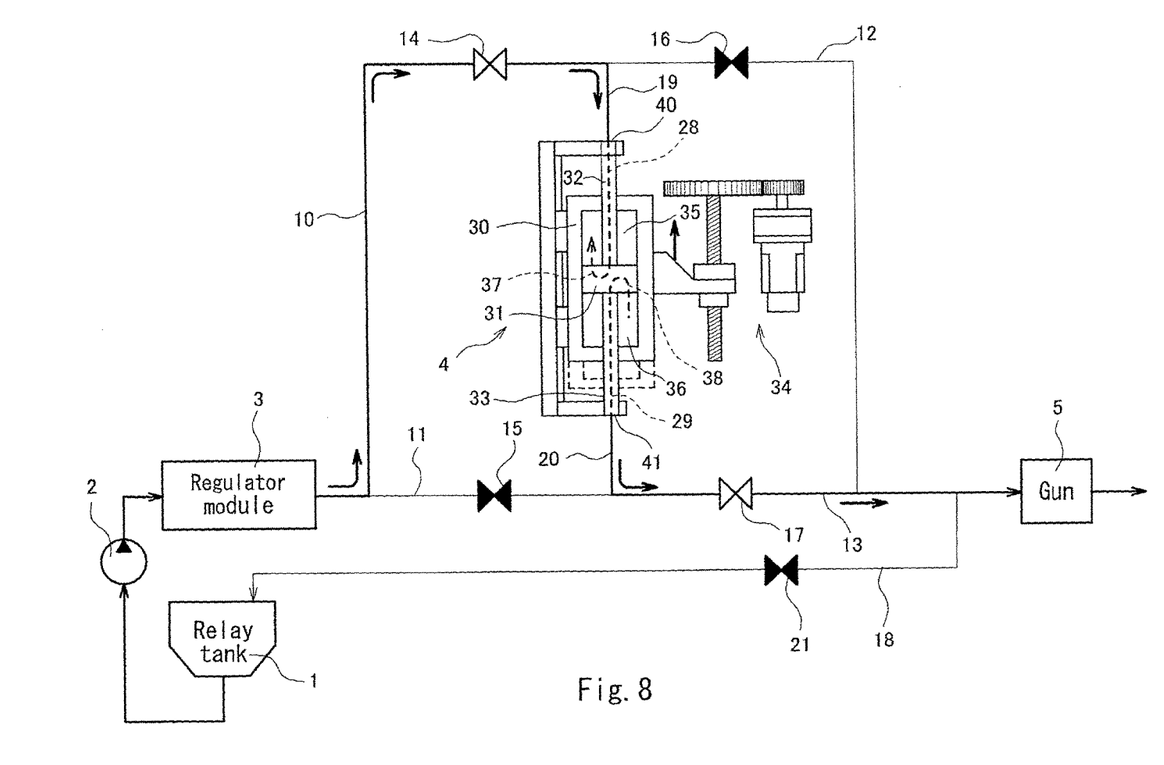
FIG. 8 is a view showing the exemplary operation of the liquid supply device of FIG. 1.

FIGS. 6 to 8 are views each showing the exemplary operation of the liquid supply device 100. In FIGS. 6 to 8, the areas of opened shutoff valves are blanked out, while the areas of closed shutoff valves are filled with a black color.

The control section 60 determines the first set position and second set position of the cylinder 30. The first set position and the second set position refer to set positions which are set in the axial direction of the first piston rod 32 and the second piston rod 33 and are set between the first position and the second position. The first set position and the second set position are set in such a manner that a difference between the volume of the first space 35 (or the second space 36) in a state in which the cylinder 30 is located at the first set position and the volume of the first space 35 (or the second space 36) in a state in which the cylinder 30 is located at the second set position becomes the volume of the liquid discharged in a specified amount. In the present embodiment, the first set position is the initial position of the cylinder 30.

Then, as shown in FIG. 6, the control section 60 opens the first shutoff valve 14, the second shutoff valve 15, the third shutoff valve 16, and the back flow shutoff valve 21, and closes the fourth shutoff valve 17.

Then, the control section 60 drives the cylinder drive section 34 to move the cylinder 30 to the first set position which is the initial position. Thereby, the volume of the second space 36 is reduced, and the liquid stored in the second space 36 is pushed out into the second merge section 20 via the second piston inner passage 38 and the second piston rod 33. As described above, since the fourth shutoff valve 17 is closed, the liquid pushed out into the second merge section 20 is pushed out of the second merge section 20 into the second supply line 11, and further into the first supply line 10. As the volume of the second space 36 is decreased, the volume of the first space 35 is increased by an amount which is equal to a decrease amount of the second space 36. Therefore, the liquid pushed out into the first supply line 10 flows into the first space 35 through the first merge section 19.

During this operation, in a case where the liquid is supplied from the material supply pump 2, the volume of the liquid flowing into the first supply line 10 exceeds the volume of the first space 35, and as a result, a part of the liquid cannot flow into the first space 35, the liquid which cannot flow into the first space 35 is pushed out of the first supply line 10 into the first discharge line 12. In a state in which the discharge gun 5 is closed, this liquid is pushed out of the first discharge line 12 into the material return line 18 and is returned to the relay tank 1.

In the above-described manner, the cylinder 30 is located at the first set position which is the initial position.

It should be noted that the operation of the liquid supply device 100 is also performed to prevent a situation in which the liquid such as the coating material remaining inside the liquid supply device body 4 and inside the first and second flow lines is solidified.

Further, the configurations of the shutoff valves which are opened or closed are not limited to the above-described configurations, and may be suitably chosen in a relation with their purposes.

Then, the exemplary operation for discharging the liquid in a specified amount from the discharge gun 5 will be described.

As shown in FIG. 7, initially, the control section 60 opens the second shutoff valve 15 and the third shutoff valve 16, and closes the first shutoff valve 14, the fourth shutoff valve 17, and the back flow shutoff valve 21.

Then, the control section 60 drives the cylinder drive section 34 to move the cylinder 30 from the first set position which is the initial position toward the second set position. Thereby, the volume of the first space 35 is decreased, and the liquid stored in the first space 35 is pushed out into the first merge section 19 via the first piston inner passage 37 and the first piston rod 32. As described above, since the first shutoff valve 14 is closed, the liquid pushed out into the first merge section 19 is pushed out of the first merge section 19 into the first discharge line 12. In addition, since the fourth shutoff valve 17 and the back flow shutoff valve 21 are closed, the liquid pushed out into the first discharge line 12 is discharged from the discharge gun 5.

At this time, the volume of the second space 36 is increased as the volume of the first space 35 is decreased, and the liquid supplied from the material supply pump 2 is supplied to the second space 36 through the second supply line 11.

In the above-described manner, the liquid is discharged in a specified amount from the discharge gun 5.

Then, the exemplary operation for discharging the liquid in a specified amount from the discharge gun 5 will be described.

As shown in FIG. 8, initially, the control section 60 opens the first shutoff valve 14 and the fourth shutoff valve 17 and closes the second shutoff valve 15, the third shutoff valve 16, the back flow shutoff valve 21.

Then, the control section 60 drives the cylinder drive section 34 to move the cylinder 30 from the second set position toward the first set position. Thereby, the volume of the second space 36 is decreased, and the liquid stored in the second space 36 is pushed out into the second merge section 20 via the second piston inner passage 38 and the second piston rod 33. As described above, since the second shutoff valve 15 is closed, the liquid pushed out into the second merge section 20 is pushed out of the second merge section 20 into the second discharge line 13. In addition, since the third shutoff valve 16 and the back flow shutoff valve 21 are closed, the liquid pushed out into the second discharge line 13 is discharged from the discharge gun 5.

At this time, as the volume of the second space 36 is decreased, the volume of the first space 35 is increased. Therefore, the liquid supplied from the material supply pump 2 is supplied to the first space 35 through the first supply line 10. In this way, in the present embodiment, filling of the liquid into the inner space of the cylinder 30 is performed concurrently with discharging of the liquid. This can eliminate a need to set a step for performing filling of the liquid into the inner space of the cylinder 30. Therefore, it becomes possible to reduce cycle time of the liquid discharging operation performed by the liquid supply device body 4.

In the above-described manner, the liquid is discharged in a specified amount from the discharge gun 5.

As described above, by moving the cylinder 30 between the first set position and the second set position, the liquid can be discharged in a specified amount from the discharge gun 5 in every stroke.

As should be understood from the foregoing description, since the liquid supply device 100 of the present invention is able to discharge the liquid by relatively moving the cylinder 30 and the piston 31, it becomes possible to prevent a pulsation from occurring in the discharge speed of the liquid. As a result, the liquid supply device 100 is applicable to a variety of uses.

Since the cylinder drive section 34 is placed laterally relative to the cylinder 30, the length of the liquid supply device body 4 in the axial direction of the first and second piston rods 32, 33 can be reduced, and hence the size of the liquid supply device body 4 can be reduced. Because of this, the liquid supply device body 4 can be placed in the vicinity of the discharge gun 5 can be mounted in the robot. The length of each of the first discharge line 12 and the second discharge line 13 connecting the liquid supply device body 4 to the discharge gun 5 can be reduced. The responsivity of the liquid discharged from the discharge gun 5 by the operation of the liquid supply device 100 can be improved.

Further, since the body unit 6 including the cylinder 30, the piston 31, the first piston rod 32, and the second piston rod 33 is detachable from the guide rail mechanism 50, the cylinder drive section 34, the first merge section 19, and the second merge section 20. In this configuration, for example, in a case where the piston rod is abraded, the body unit 6 can be replaced (changed) in such a manner that the body unit 6 including the abraded piston rod is detached from the liquid supply device body 4, and a new body unit 6 is mounted to the liquid supply device body 4. Thus, the replacement (change) of the body unit 6 can be performed easily and quickly. As a result, stop time of a manufacturing line can be reduced.

Modified Example

Although in the above-described embodiment, the cylinder drive section 34 including the ball screw mechanism 46 is configured to drive the cylinder 30 to cause the cylinder 30 to reciprocate between the first position and the second position, the configuration for driving the cylinder 30 is not limited to this. Alternatively, a drive section including a rack and pinion mechanism may be configured to drive the cylinder 30 to cause the cylinder 30 to reciprocate between the first position and the second position.

Although in the above-described embodiment, the cylinder drive section 34 including the servo motor 45 is configured to drive the cylinder 30 to cause the cylinder 30 to reciprocate between the first position and the second position, the configuration for driving the cylinder 30 is not limited to this. Alternatively, the cylinder drive section 34 including an air cylinder or a hydraulic cylinder may be configured to drive the cylinder 30 to cause the cylinder 30 to reciprocate between the first position and the second position.

Figure 9:
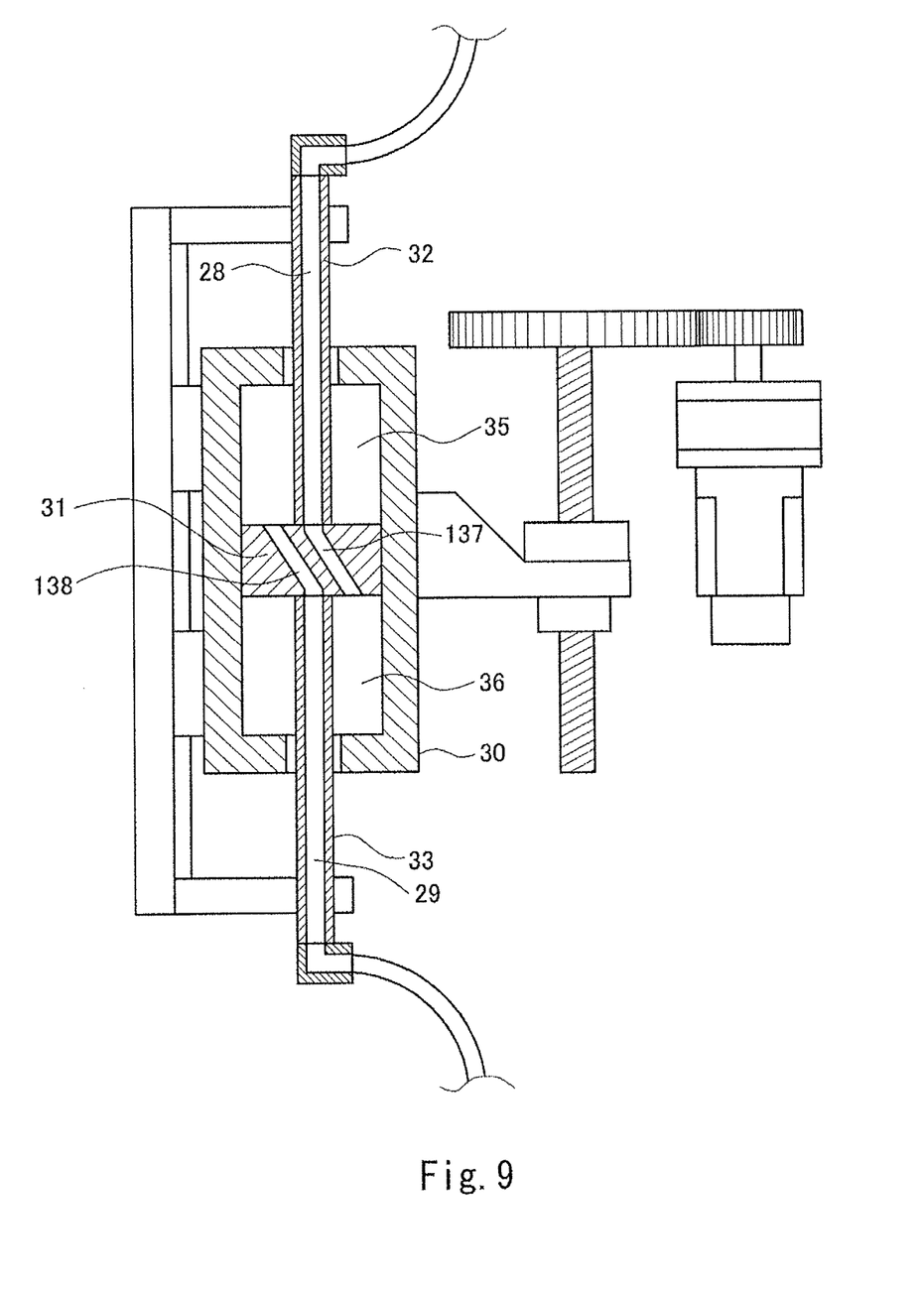
FIG. 9 is a view showing the modified example of the liquid supply device according to the embodiment of the present invention.

Although in the above-described embodiment, the piston 31 is formed with the first piston inner passage 37 via which the first space 35 and the first piston rod inner passage 28 are in communication with each other, and the second piston inner passage 38 via which the second space 36 and the second piston rod inner passage 29 are in communication with each other, the configurations of the passages formed in the piston 31 are not limited to these. Alternatively, as shown in FIG. 9, the piston 31 may be formed with a first piston inner passage 137 via which the second space 36 and the first piston rod inner passage 28 are in communication with each other, and a second piston inner passage 138 via which the first space 35 and the second piston rod inner passage 29 are in communication with each other.

Figure 10:
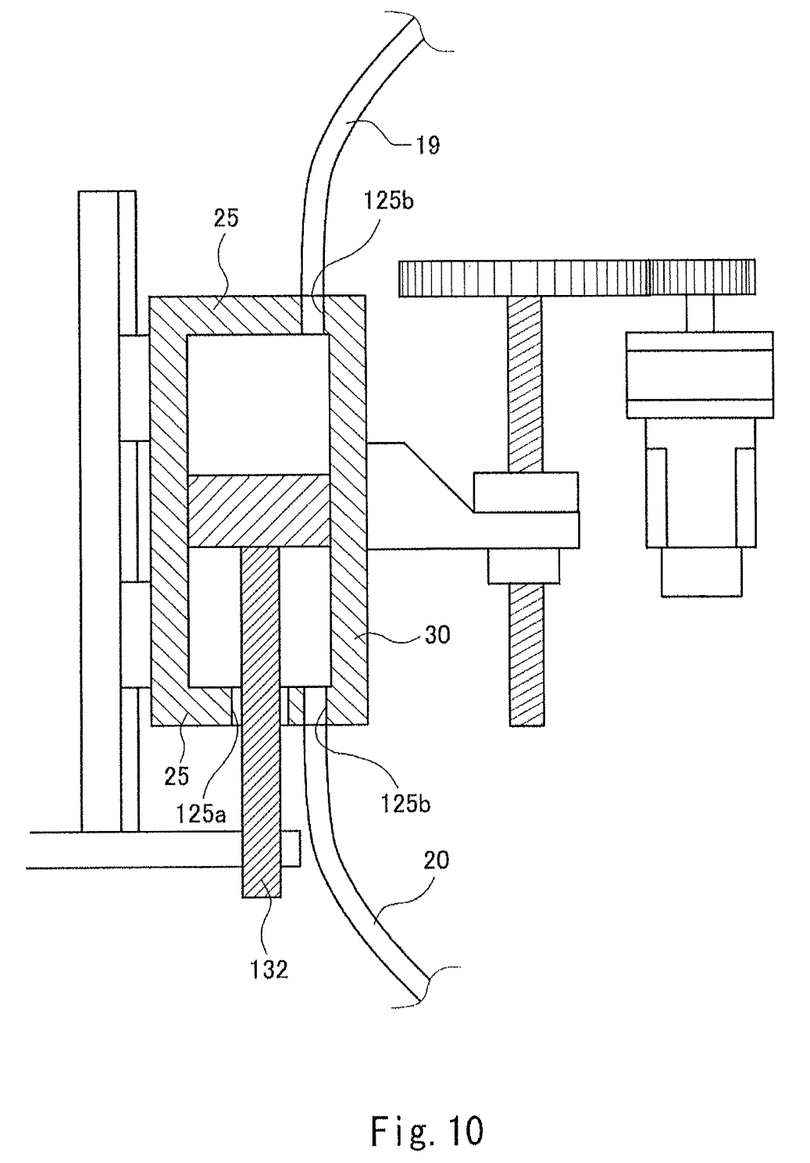
FIG. 10 is a view showing the modified example of the liquid supply device according to the embodiment of the present invention.

Although in the above-described embodiment, the first flow line is in communication with the first space 35 via the first piston inner passage 37 and the first piston rod inner passage 28, and the second flow line is in communication with the second space 36 via the second piston inner passage 38 and the second piston rod inner passage 29, the configurations of the first flow line and the second flow line are not limited to this. Alternatively, as shown in FIG. 10, the first flow line and the second flow line may be connected to connection ports 125b formed in the end portion wall surfaces 25 of the cylinder 30, respectively. As shown in FIG. 10, one of the end portion wall surfaces 25 of the cylinder 30 may be formed with a through-hole 125a penetrating therethrough, and a piston rod 132 may be inserted the through-hole 125a.

INDUSTRIAL APPLICABILITY

The present application is applicable to a liquid supply device which supplies a coating material to a discharge gun of a coating robot.

REFERENCE SIGNS LIST 1 relay tank
2 material supply pump
3 regulator module
4 liquid supply device body
5 discharge gun
6 body unit
10 first supply line
11 second supply line
12 first discharge line
13 second discharge line
14 first shutoff valve
15 second shutoff valve
16 third shutoff valve
17 fourth shutoff valve
18 material return line
19 first merge section
20 second merge section
21 back flow shutoff valve
25 end portion wall surface
25a through-hole
28 first piston rod inner passage
29 second piston rod inner passage
30 cylinder
31 piston
32 first piston rod
33 second piston rod
34 cylinder drive section
35 first space
36 second space
37 first piston inner passage
38 second piston inner passage
40 first supply/discharge port
41 second supply/discharge port
45 servo motor
46 ball screw mechanism
47 ball screw
48 slider
49 reduction gear
50 guide rail mechanism
51 guide rail
52 guide rail slider
53 first piston rod support section
54 second piston rod support section
60 control section
61 memory section
100 liquid supply device

The invention claimed is:

1. A liquid supply device which supplies liquid stored in a tank to a target object, comprising:
a cylinder having both end portions closed;
a piston which comparts an inner space of the cylinder into a first space and a second space, and is relatively slidable on an inner wall surface of the cylinder;
a piston rod which extends to penetrate one of the end portions of the cylinder and has a tip end portion connected to the piston;
a frame member to which a portion of the piston rod which is located outside the cylinder is fastened;
a drive section which causes the cylinder to reciprocate in a direction in which the piston rod extends;
a first flow line which is in communication with the tank and with the first space to flow the liquid therethrough; and
a second flow line which is in communication with the tank and with the second space to flow the liquid therethrough,
wherein the first flow line includes a first supply line provided on a line connecting the tank to the first space, and a first discharge line provided on a line connecting the first space to the target object, and
wherein the second flow line includes a second supply line provided on a line connecting the tank to the second space, and a second discharge line provided on a line connecting the second space to the target object.

2. The liquid supply device according to claim 1, wherein the drive section is placed laterally relative to the cylinder.

3. The liquid supply device according to claim 1, wherein the drive section includes a motor, and a driving force transmission mechanism which converts a rotational force of the motor into a linear movement force, and causes a movable member to linearly move in the direction in which the piston rod extends,
wherein the portion of the piston rod which is located outside the cylinder is configured to be capable of being unfastened, and
wherein the cylinder is detachably mounted to the movable member.

4. The liquid supply device according to claim 3, wherein the driving force transmission mechanism includes a ball screw extending in the direction in which the piston rod extends, a slider which is threadingly engageable with the ball screw, and a guide bar which extends in parallel with the ball screw, and guides the slider in a direction in which the guide bar extends.

5. The liquid supply device according to claim 1, wherein the first flow line or the second flow line is in communication with the first space or the second space, respectively, via a passage formed inside the piston rod and a passage formed inside the piston.

* * * * *